United States Patent [19]

Bass

[11] Patent Number: 4,842,962
[45] Date of Patent: Jun. 27, 1989

[54] FUEL CELL AND MOLD THEREFOR

[76] Inventor: Robert H. Bass, 2030 Mill Creek, Garland, Tex. 75042

[21] Appl. No.: 180,325

[22] Filed: Apr. 11, 1988

[51] Int. Cl.$^4$ .............................................. H01M 2/02
[52] U.S. Cl. ......................................... 429/12; 429/34
[58] Field of Search ..................... 429/12, 34, 176, 38, 429/39

[56] References Cited

U.S. PATENT DOCUMENTS

| | | | |
|---|---|---|---|
| 3,424,620 | 1/1969 | Hughes et al. | 429/34 |
| 3,982,961 | 9/1976 | Grasso | 429/34 |
| 4,476,197 | 10/1984 | Herceg | 429/34 X |

Primary Examiner—Anthony Skapars
Attorney, Agent, or Firm—John M. Harrison

[57] ABSTRACT

A fuel cell and mold therefor, which fuel cell is characterized by a molded plastic fuel container having a fuel pick-up opening in the top thereof and a molded wedge provided in the bottom thereof in angular relationship, which molded wedge serves to isolate and accumulate small quantities of fuel when the fuel cell is almost empty, to facilitate more efficient retrieval of fuel from the fuel cell. The fuel cell is molded inside a two-piece mold provided with mating flanges and a wedge blade slot is shaped in the bottom mold section for receiving a removable wedge insert blade designed to shape the molded wedge in the fuel cell. The mold is charged with a plastic powder and catalyst mixture and is attached to a rotating apparatus to effect simultaneous rotation on two axes while heated, to melt the plastic powder and shape the fuel cell.

19 Claims, 1 Drawing Sheet

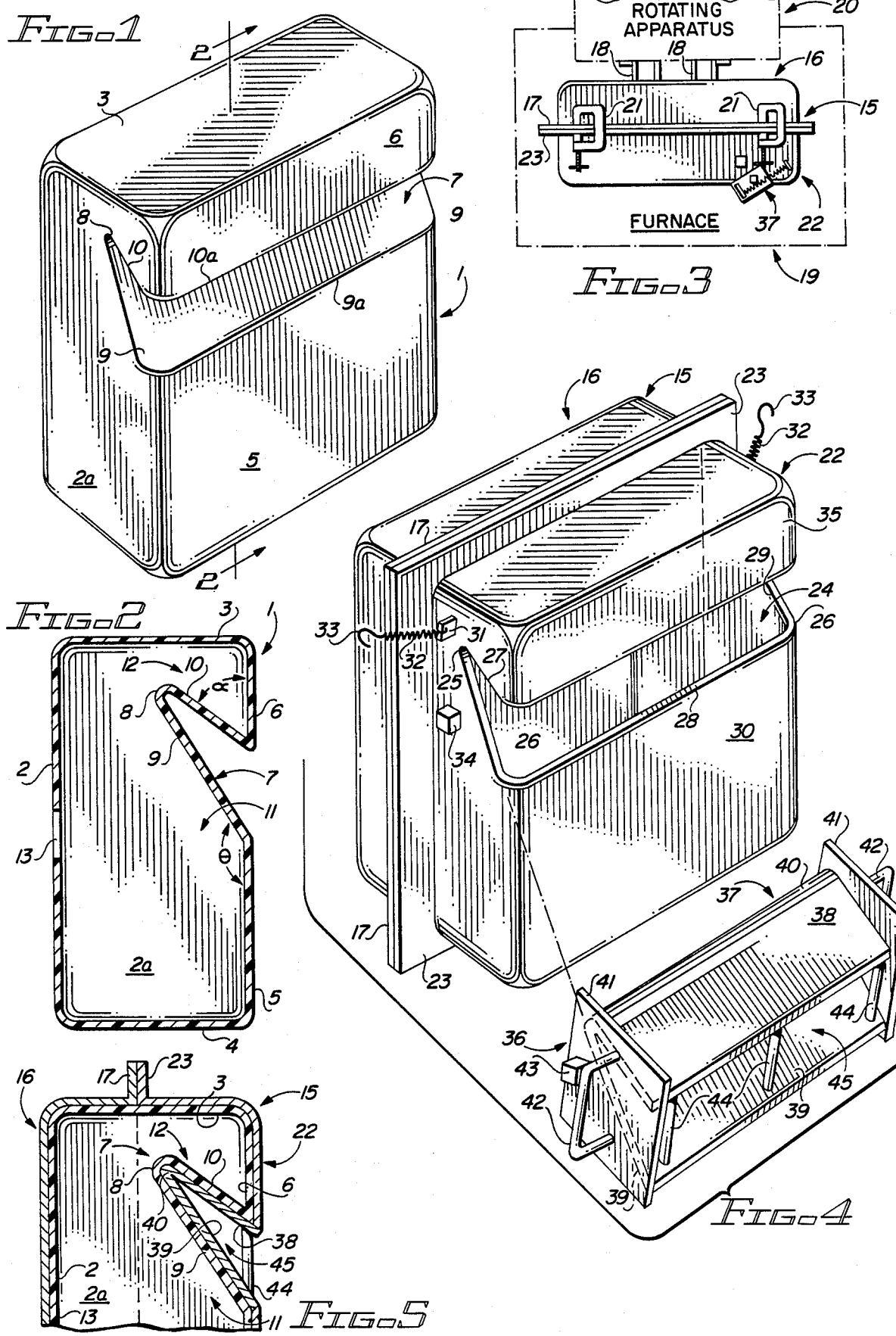

FUEL CELL AND MOLD THEREFOR

BACKGROUND OF THE INVENTION

1. Field of the Invention

This invention relates to fuel tank for vehicles and more particularly, to a molded "plastic" fuel tank or "fuel cell" for racing vehicles and a mold for shaping the fuel cell. A primary feature of the fuel cell and mold detailed herein is the provision of a fuel cell having a molded wedge in the bottom thereof, which molded wedge extends from one side of the fuel cell to the other in angular relationship between the end portions. This wedge design facilitates the isolation of small quantities of fuel in a confined space between the molded wedge and one end of the fuel cell for more efficient fuel pick-up when the fuel cell is almost empty. The angle is created in the molded wedge by utilizing a two-piece split mold having a bottom section fitted with a wedge blade slot for receiving a removable wedge insert blade which defines the shape of the molded wedge in the fuel cell. In a preferred embodiment, the wedge insert blade is secured in the wedge blade slot, a granulated plastic material such as polyethylene is introduced along with a polymerization catalyst into the bottom section of the two-piece mold, the mold is closed by seating the top section on the bottom section and the top section is attached to a conventional rotating apparatus capable of rotating the mold simultaneously on two axes. The mold is then located in a furnace and heated while the rotating apparatus is operated, to melt the plastic powder, initiate the polymerization reaction and line the inside of the two-piece mold with the chosen plastic material in a desired thickness and consistency. The fuel cell is then removed from the mold by removing the top segment of the mold and the wedge insert blade.

2. Description of the Prior Art

One of the problems realized at a relatively early date in the racing of automobiles on oval tracks was that of designing a fuel tank or cell system which is capable of removing the last few ounces of fuel from the tank while the racing car is operating at high speeds. This problem is intensified by centrifugal force which operates on the fuel and causes the fuel to "pool" at the outside end of the tank as the racing car travels in an oval configuration on the track in a counterclockwise direction. Since the fuel pick-up mechanism is normally located in the center of the tank, when the tank is almost empty, the fuel is displaced from the pick-up mechanism by centrifugal force and the fuel pick-up mechanism is unable to remove all of the fuel from the tank. The problem has been partially eliminated by orienting the fuel pick-up mechanism at the juncture between the side and bottom of the tank, to retrieve more fuel when the tank is almost empty. However, due to the size of the tank, this fuel is normally distributed across the inside peripheral bottom and side portions of the tank in a thin layer, thereby further rendering complete emptying of the tank impossible. A modern solution to the problem is the construction of metal tanks having a molded wedge built therein, which wedge extends from one side of the tank to the other in angular orientation toward one end of the tank. The wedge is typically angled to the right, or outside, as the racing car and tank are viewed from the rear, in order to facilitate the flow of fuel over the top of the wedge by centrifugal force, where the fuel is trapped in a small space located between the right hand, or outside end of the tank and the angled underside of the wedge itself. The fuel pick-up mechanism is oriented to extend into this small compartment to facilitate retrieval of small quantities of fuel which remain in the tank during a race. Accordingly, the molded wedge serves as a collection device for isolating and collecting residual quantities of fuel for more efficient pick-up to the carburetor or fuel injection system of the racing car when the tank is almost empty.

A problem which is realized in the construction of metal fuel tanks of this design is the expense of such construction, which requires extensive fabrication by hand to create the metal wedge compartment in the interior of the tank and facilitate the desired collection of residual quantities of fuel. A cheaper design has long been sought and other materials of construction have been envisioned for the construction of lighter and less expensive fuel tanks, or cells from plastic or alternative materials which are impervious and non-reactive to methanol and other fuel blends used in modern racing cars.

Accordingly, it is an object of this invention to provide a new and improved molded fuel tank or cell and mold therefore, which molded fuel cell is characterized by a container of selected size having a molded wedge provided in the bottom thereof near the right hand, or outside end, as the fuel cell is viewed from the rear when oriented in a racing car located in racing position on an oval track and traveling in a counterclockwise direction, in order to facilitate the collection and pooling of fuel in a small area defined by the molded wedge and the right hand end of the fuel cell.

Another object of the invention is to provide a new and improved fuel tank, container or cell for racing cars, which fuel is molded from a plastic material such as polyethylene, in non-exclusive particular, and includes a wedge portion molded in angular relationship in the bottom near one end of the fuel cell, for trapping and collecting residual quantities of fuel during a race and facilitating the removal of substantially all of the fuel from the fuel cell by operation of conventional fuel pick-up devices.

Yet another object of this invention is to provide a new and improved molded thermosetting fuel cell for use in racing vehicles, which fuel cell is characterized by a plastic, wedge-shaped barrier molded in the bottom of the fuel cell between the sides thereof and oriented in angular relationship near a collection end of the fuel cell, for collecting fuel in a confined space or compartment between the wedge and the collection end, in order to facilitate more efficiently retrieving the fuel from the fuel cell using conventional fuel pick-up apparatus.

A still further object of this invention is to provide a split mold for molding a plastic fuel cell having an angled molded wedge in the bottom thereof, which mold is further characterized by a top segment and a bottom segment, the bottom segment further including a tapered wedge blade slot and a wedge insert blade designed to removably engage the wedge blade slot, for shaping the molded wedge in the fuel cell.

Still another object of the invention is to provide a new and improved split mold for molding a plastic fuel cell for containing fuel for racing cars, which mold is characterized by a top segment and a bottom segment that are joined at matched, flat flanged faces thereof and which bottom segment further includes a wedge blade slot provided in angular relationship in opposite sides thereof near one end of the mold and a wedge insert blade shaped for insertion in the wedge blade slot, in order to facilitate molding of the fuel cell by operation of a conventional rotating apparatus about dual axes during application of heat to the mold.

SUMMARY OF THE INVENTION

These and other objects of the invention are provided in a new and improved fuel cell and mold for creating the fuel cell, which fuel cell is characterized by a box-like fuel container or tank molded of a plastic material and having a molded wedge-shaped barrier provided in the bottom near one end and spanning the sides thereof, for isolating and accumulating the fuel during a race. A split mold for shaping the fuel cell, which split mold includes a top section and a bottom section provided with a wedge blade slot for receiving a removable wedge insert designed to shape the molded wedge-shaped barrier in the fuel cell from plastic powder and catalyst charged in the mold and heated in a furnace while the mold is rotated simultaneously on two axes.

BRIEF DESCRIPTION OF THE DRAWING

The invention will be better understood by reference to the accompanying drawing, wherein:

FIG. 1 is a perspective view of a plastic fuel cell molded by a specially designed mold according to this invention;

FIG. 2 is a sectional view taken along line 2—2 of the fuel cell illustrated in FIG. 1;

FIG. 3 is a side view of a preferred split mold for molding the fuel cell illustrated in FIGS. 1 and 2, which mold is located in a furnace and is supported by a rotating apparatus; and FIG. 4 is a perspective view of the mold illustrated in FIG. 3, with a wedge insert component illustrated in position for insertion in a companion wedge blade slot located in the bottom section of the mold.

DESCRIPTION OF THE PREFERRED EMBODIMENTS

Referring initially to FIGS. 1 and 2 of the drawing, the fuel cell of this invention is generally illustrated by reference numeral 1 and is characterized by a top segment 2, oppositely disposed side segments 2a, a right end segment 3 and a left end segment 4. The fuel cell 1 is closed by a lefthand bottom segment 5 and a right-hand bottom segment 6, which are separated along the short segment margin 10a and the long segment margin 9a by a molded wedge 7, that extends interiorly of the fuel cell 1 and terminates in a molded wedge tip 8. In a preferred embodiment of the invention, the molded wedge 7 is further characterized by a long wedge plate 9 which projects into the side segments 2a from the long segment margin 9a to the molded tip edge 8 and a corresponding short wedge plate 10, which projects into the side segments 2a from the short segment margin 10a to the molded wedge tip 8. While the long wedge plate 9 can be oriented at substantially any selected angle $\theta$ with respect to the left hand bottom segment 5 which will allow fuel to flow over the long wedge plate 9 into the small compartment 12, in a most preferred embodiment, this angle $\theta$ is in the range of from about 120 to about 160 degrees. Accordingly, the angle $\gamma$ between the short wedge plate 10 and the right hand bottom segment 6 may be any selected angle which facilitates joining the short wedge plate 10 to the long wedge plate 9 in angular relationship at the molded wedge tip 8. In a most preferred embodiment wherein the angle $\theta$ is in the range of from about 120 to about 160 degrees, the angle $\gamma$ is in the range of from about 40 to about 120 degrees. Accordingly, the fuel cell 1 should be envisioned as resting on the left-hand bottom segment 5 and the right-hand bottom segment 6 with the molded wedge tip 8 angled to the right as the fuel cell 1 is viewed from the rear, or closest side segment 2a. The fuel cell 1 is inserted in a racing car in this configuration, such that movement of the racing car at high speeds around an oval track in the counterclockwise direction causes fuel located inside the fuel cell 1 to flow from the large compartment 11 over the long wedge plate 9 and the molded wedge tip 8 and accumulate in that portion of the fuel cell 1 which is defined by the short wedge plate 10 and the right end segment 3, identified as the small compartment 12. Accordingly, as illustrated in FIG. 2, a conventional fuel pick-up device (not illustrated) can be inserted in the fuel pick-up opening 13 provided in the top segment 2 of the fuel cell 1 and extended into the small compartment 12, in order to retrieve even very small quantities of fuel from the fuel cell 1.

Referring now to FIGS. 3-5 of the drawing, the mold for constructing the fuel cell 1 is generally illustrated by reference numeral 15. The mold 15 is further characterized by a top section 16, bordered by a top section flange 17 and a companion bottom section 22, fitted with a matching bottom section flange 23. As further illustrated in FIGS. 3 and 4, the top section flange 17 and the bottom section flange 23 are designed to match when the mold 15 is ready for mounting in a conventional rotating apparatus 20 and location in the furnace 19, as hereinafter further described. A pair of spaced mount brackets 18, illustrated in FIG. 3, are welded or otherwise secured to the top section 16 of the mold 15, in order to facilitate attachment of the mold 15 to the rotating apparatus 20. As further illustrated in FIG. 4, the bottom section 22 is further characterized by a wedge blade slot 24, which spaces a left-hand bottom panel 30 and a corresponding right-hand bottom panel 35. The wedge blade slot 24 is further characterized by a long slot leg 26, which extends from a long slot margin 28 in the left-hand bottom panel 30, to a slot tip 25, as illustrated. A short slot leg 27 projects from the short slot margin 29 of the right-hand bottom panel 35 and joins the long slot leg 26 at the slot tip 25. Furthermore, a bottom panel block 34 is provided on each side of the bottom section 22 adjacent the long slot leg 26 thereof and a pair of spring brackets 31 are welded or otherwise attached to the sides of the bottom section 22 in oppositely-disposed relationship adjacent to the slot tip 25 therein, respectively. A pair of retainer springs 32 are secured to the spring brackets 31, respectively, and a pair of retainer hooks 33 are attached to the opposite ends of the retainer springs 32, respectively, as further illustrated in FIGURE 4.

Referring again to FIGS. 4 and 5 of the drawing, a wedge insert is generally defined by reference numeral 36 and is designed to engage and plug the wedge blade slot 24, in order to shape the molded wedge 7 in the fuel cell 1, as hereinafter further described. The wedge insert 36 is further characterized by a wedge insert blade 37, defined by a short blade segment 38 and a corresponding long blade segment 39 that meet at a blade tip 40. The short blade segment 38 and the long blade segment 38 are spaced at the opposite edges thereof by three blade segment spacers 44, to define a blade segment cavity 45, which helps cool the wedge insert 36, as hereinafter further described. The wedge insert blade 37 is designed to tightly seal the wedge blade slot 24 by engaging the respective short slot legs 27 with the corresponding short blade segment 38 and the parallel long slot legs 26 with the companion long blade segment 39, respectively. A pair of side plates 41 are provided in oppositely-disposed relationship on the ends of the wedge insert blade 37 and a pair of plate handles 44 are welded or otherwise secured to the side plates 41, in order to facilitate handling the wedge insert 36, as hereinafter further described. A plate block 43 is welded or otherwise secured to each of the side plates 41 for alignment with the bottom panel blocks 34 located on opposite sides of the bottom section 22, for purposes which will be further hereinafter described.

In operation, the wedge insert blade 37 of the wedge insert 36 is initially inserted in the wedge blade slot 24 of the bottom section 22, with the blade tip 40 projecting inside the mold 15, as illustrated in FIG. 5. The retainer hooks 33 are then extended against the bias of the respective retainer springs 32 and hooked to the corresponding plate handles 42, in order to secure the wedge insert 36 to the bottom section 22, as illustrated in FIG. 3. If so desired, an additional clamping means such as a pair of C-clamps (not illustrated) can be attached to each set of the aligned bottom panel blocks 34 and the companion plate blocks 43, respectively, to further secure the mold in operating configurations as illustrated in FIG. 3. A suitable mold release material is then applied to all internal surfaces of the top section 16 and the bottom section 22 and to the wedge insert blade 22. A mixture of a quantity of polyethylene powder or granules and catalyst is placed in the bottom section 22 of the mold 15 and the top section 16 is positioned on the bottom section 22 with the top section flange 17 seated on the bottom section flange 23 and secured by the C-clamps 21, as illustrated in FIG. 3. The mount brackets 18 are then placed in engagement with the rotating apparatus 20, in order to suspend the mold 15 in the rotating apparatus 20, as further illustrated in FIG. 3. It will be appreciated by those skilled in the art that substantially any conventional rotating apparatus which is capable of rotating a mold simultaneously on two axes may be used in order to construct the fuel cell 1 using the mold 15 of this invention. The mold 15 is then located in the interior of a furnace 19, as further illustrated in FIG. 3 and the rotating apparatus 20 is activated to rotate the mold 15 simultaneously on two axes. The plastic powder located inside the mold 15 then melts responsive to heat generated in the furnace 19 and polymerizes responsive to catalyst activity, to form an integral structure over the entire interior area of the top section 16, bottom section 22 and the wedge insert blade 37. The mold 15 is then cooled while still rotating responsive to operation of the rotating apparatus 20 and when cool, the mold is removed from the furnace 19. The mount brackets 18 may then be disengaged from the rotating apparatus 20 and the retainer hooks 33 are disengaged from the respective plate handles 42. The wedge insert 36 is then grasped by gripping the plate handles 42 and is removed from the wedge blade slot 24. The mold is then positioned such that left hand bottom section 30 and the right hand bottom section 35 are placed flat on a supporting surface the C-clamps 21 are removed and the top section 16 of the mold 15 is removed from the bottom section 22, in order to facilitate removal of the fuel cell 1, which is constructed as illustrated in FIGS. 1 and 2. Alternatively, the top section 16 of the mold 15 can be left in mounted configuration to the rotating apparatus 20 and the C-clamps 21 removed, to separate the bottom section 22 from the top section 16, after the wedge insert 36 is removed from the wedge blade slot 24.

In a preferred embodiment of the invention, the material used to make the fuel cell 1 is characterized by polyethylene beads, pellets or powder, in combination with an endothermic pyrolitic catalyst, which produces a fuel cell having a three-dimensional, irreversible cross-linked grain structure. It will be appreciated by those skilled in the art that the quantity and proportion of polyethylene plastic and catalyst added to the mold 15, along with the amount of heat applied to the mold by operation of the furnace 19 and the retention time in the furnace 19, are each important parameters which may be varied to produce a fuel cell 1 of selected wall thickness and density characteristics. Furthermore, it will be appreciated by those skilled in the art that various thermoplastic, thermosetting, and other "plastic" materials such as polypropylene and the like, in nonexclusive particular, which are known to those skilled in the art can be treated in the same manner by using a heat-activated, cross-linking catalyst to create fuel cells of the same shape and having various selected chemical properties, depending upon the type of fuel to be contained therein.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A fuel cell comprising a molded plastic container having oppositely-disposed sides, oppositely-disposed ends joining said sides; a top panel and a bottom panel joining said sides and said ends, respectively, and further comprising molded wedge means provided in said bottom panel, said wedge means projecting from said bottom panel into said sides and extending into the interior of said container in angular relationship, whereby fuel contained in said container may be trapped and accumulated between said wedge means and one of said ends of said container.

2. The fuel cell of claim 1 wherein said wedge means further comprises a first slot plate extending inwardly of said container from said bottom panel into said sides at a first selected angle and a second slot plate extending inwardly of said container from said bottom panel into said sides at a second selected angle, said first slot plate converging with said second slot plate to define a wedge tip.

3. The fuel cell of claim 1 further comprising at least one opening provided in said top panel of said container.

4. The fuel cell of claim 1 further comprising at least one opening provided in said top panel of said container and wherein said wedge means further comprises a first slot plate extending inwardly of said container from said bottom panel into said sides at a first selected angle with respect to said bottom panel and a second slot plate extending inwardly of said container from said bottom panel into said sides at a second selected angle with respect to said bottom panel, said first slot plate converging with said second slot plate to define a wedge tip.

5. The fuel cell of claim 1 wherein said first selected angle is in the range of from about 120 degrees to about 160 degrees and said second selected angle is in the range of from about 40 degrees to about 120 degrees.

6. The fuel cell of claim 5 further comprising at least one opening in said top panel of said container and wherein said wedge means further comprises a first slot plate extending inwardly of said container from said bottom panel into said sides at a first selected angle with respect to said bottom panel and a second slot plate extending inwardly of said container from said bottom panel into said sides at a second selected angle with respect to said bottom panel, said first slot plate intersecting said second slot plate to define a wedge tip.

7. The fuel cell of claim 1 wherein said wedge means is located nearer one of said ends than the other of said ends.

8. The fuel cell of claim 7 wherein said wedge means further comprises a first slot plate extending inwardly of said container from said bottom panel into said sides at a first selected angle with respect to said bottom panel and a second slot plate extending inwardly of said container from said bottom panel into said sides at a second selected angle with respect to said bottom panel, said first slot plate converging with said second slot plate to define a wedge tip.

9. The fuel cell of claim 8 further comprising at least one opening in said top panel of said container.

10. The fuel cell of claim 9 wherein said first selected angle is in the range of from about 120 degrees to about 160 degrees and said second selected angle is in the range of from about 40 degrees to about 120 degrees.

11. The fuel cell of claim 10 wherein said molded plastic container is polyethylene.

12. The fuel cell of claim 11 wherein said first selected angle is about 120 degrees and said second selected angle is about 120 degrees.

13. A fuel cell comprising a molded plastic container having a substantially flat bottom and molded wedge means provided in said bottom, said wedge means projecting from said bottom into the interior of said container in angular relationship, whereby fuel contained in said container may be trapped and accumulated between said wedge means and the walls of said container.

14. The fuel cell of claim 13 wherein said wedge means further comprises a first slot plate extending inwardly of said container from said bottom panel at a first selected angle with respect to said bottom panel and a second slot plate extending inwardly of said container from said bottom panel at a second selected angle with respect to said bottom panel, said first slot plate converging with said second slot plate to define a wedge tip.

15. The fuel cell of claim 14 further comprising at least one opening provided in said top panel of said container and wherein said wedge means further comprises a first slot plate extending inwardly of said container from said bottom panel at a first selected angle with respect to said bottom panel and a second slot plate extending inwardly of said container from said bottom panel at a second selected angle with respect to said bottom panel, said first slot plate converging with said second slot plate to define a wedge tip.

16. The fuel cell of claim 15 wherein said first selected angle is in the range of from about 120 degrees to about 160 degrees and said second selected angle is in the range of from about 40 degrees to about 120 degrees.

17. The fuel cell of claim 16 wherein said wedge tip is located in spaced, substantially parallel relationship from the transverse center axis of said container.

18. The fuel cell of claim 17 wherein said first selected angle is in the range of from about 120 degrees to about 160 degrees and said second selected angle is in the range of from about 40 degrees to about 120 degrees.

19. The fuel cell of claim 18 wherein said molded plastic container is polyethylene.

* * * * *